July 13, 1943. E. W. NEALE 2,324,229
LATTICE STRUCTURE
Filed April 10, 1942

Inventor
E. W. Neale,
By Glascock Downing Liebold
Attys

Patented July 13, 1943

2,324,229

UNITED STATES PATENT OFFICE 2,324,229

LATTICE STRUCTURE

Edgar Walter Neale, Birmingham, England

Application April 10, 1942, Serial No. 438,513
In Great Britain April 1, 1941

1 Claim. (Cl. 20—91)

This invention has for its object to provide an improved lattice structure, adapted more especially for use in the construction of aeroplanes, small boats, and other analogous hollow bodies in which it is necessary to combine a minimum of weight with a maximum of strength.

In the accompanying sheet of explanatory drawings—

Figure 1:
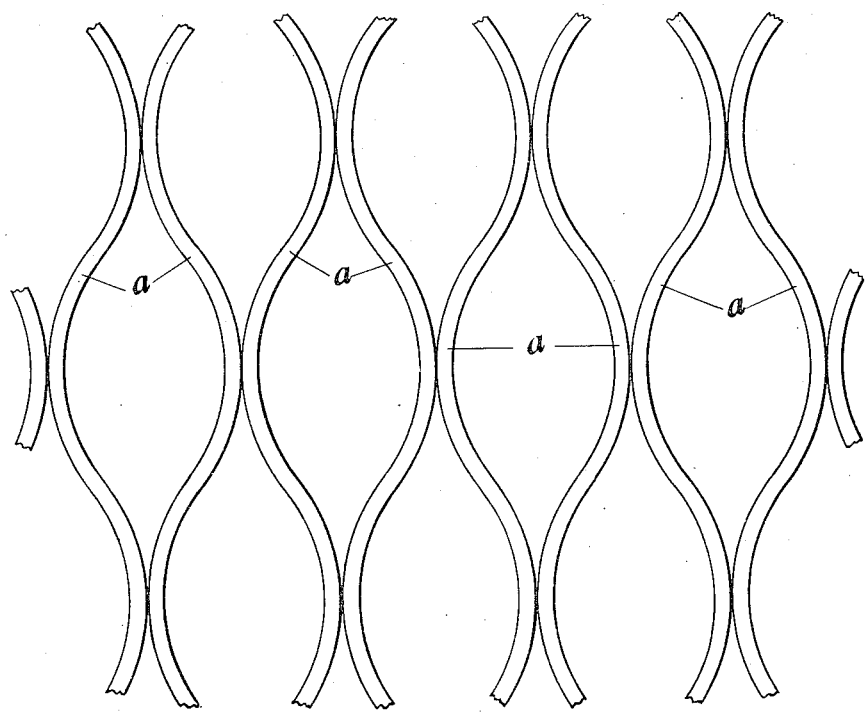
Figure 2:
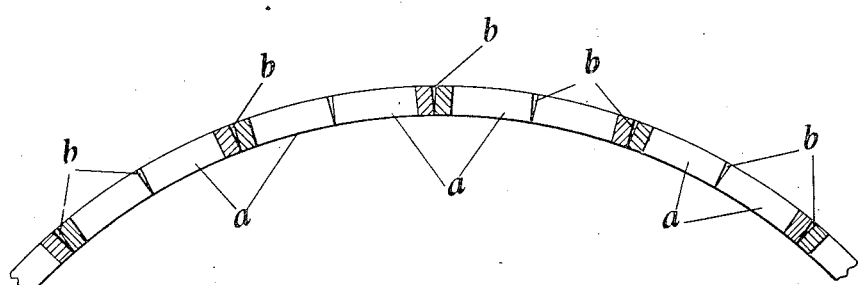

Figures 1 and 2 are respectively a developed front view and a cross sectional view of a lattice structure constructed in accordance with the invention for use in the manufacture of a hollow body, such as a part of an aeroplane fusilage, or the hull of a small boat.

In carrying the invention into effect as shown I employ an appropriate number of narrow strips $a$, these being of suitable length, and made from any convenient light material. Preferably, each strip is made from ply-wood, though it may be made from aluminium alloy or other metal or material. Also each strip is bent along its length to a sinusoidal form, that is to say a curved wavy form. Further the lattice formed by the strips is shaped transversely to a curved form. In forming the lattice the strips $a$ are arranged longitudinally around a former or pattern of curved cross section, with their crests and furrows in contact, and the contiguous points are secured together by cement, rivets, bolts, welding, brazing or other convenient means. Due to the curvature of the former or pattern the contacting portions of each adjacent pair of strips have outwardly divergent wedge-shaped gaps between them as shown in Figure 2, and into these gaps I insert wedge-shaped filling pieces $b$, these latter being secured by the same means as serve to secure the strips together.

By my invention the desired lightness and strength are obtained in a very simple manner with ease of manufacture, and economy of material.

Having thus described my invention what I do claim as new and desire to secure by Letters Patent is:

A transversely curved lattice structure comprising in combination a plurality of strips of structural material arranged side by side, each strip being similarly shaped to a wavy form, means for securing the contiguous strips together at crests of the waves, and wedge-shaped filling pieces arranged in correspondingly shaped gaps formed between the crests of the waves as a result to the transverse curvature of the structure, the said filling pieces being secured in position by the means employed for securing the strips together.

EDGAR WALTER NEALE.